A. N. ALLEN.
TRUCK.
APPLICATION FILED MAY 8, 1916.
1,201,790.
Patented Oct. 17, 1916.
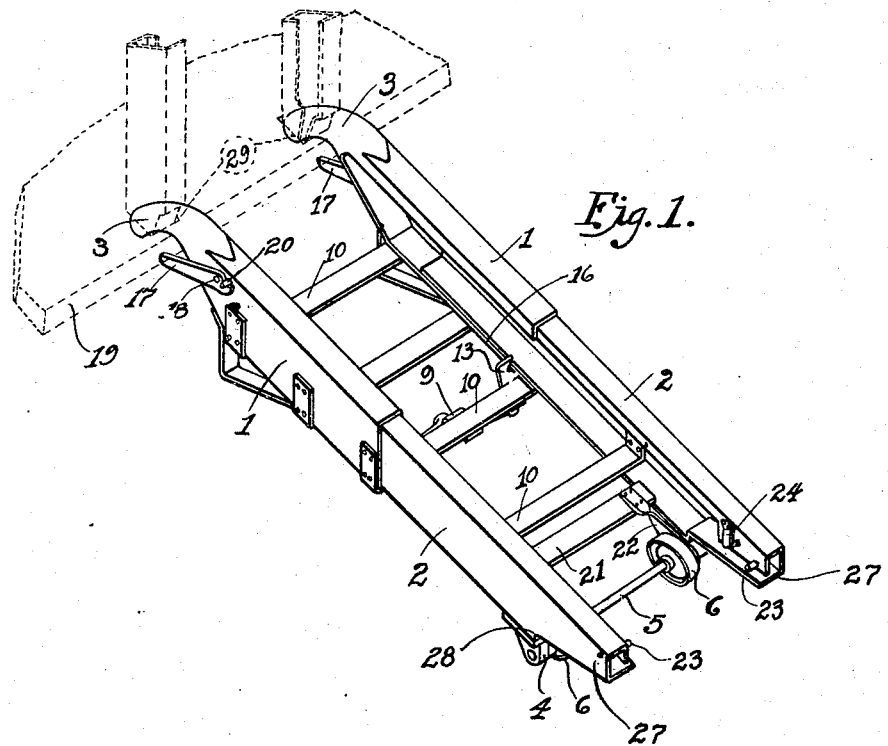
Fig. 1.
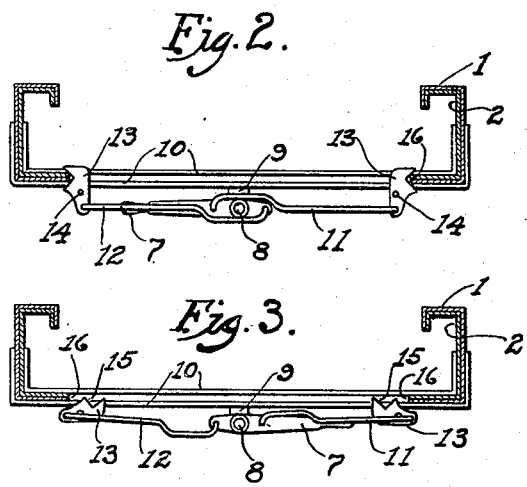
Fig. 2.
Fig. 3.
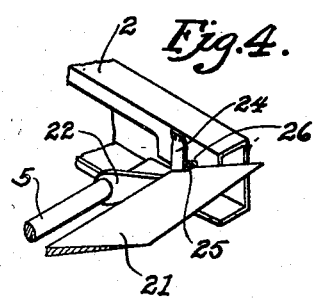
Fig. 4.
A. N. Allen INVENTOR.
BY E. F. Bond
ATTORNEY.

UNITED STATES PATENT OFFICE.

AUGUST N. ALLEN, OF GREEN BAY, WISCONSIN.

TRUCK.

1,201,790. Specification of Letters Patent. Patented Oct. 17, 1916.

Application filed May 8, 1916. Serial No. 96,225.

*To all whom it may concern:*

Be it known that I, AUGUST N. ALLEN, a citizen of the United States of America, residing at Green Bay, in the county of Brown and State of Wisconsin, have invented certain new and useful Improvements in Trucks, of which the following is a specification, reference being had therein to the accompanying drawing.

The invention relates to trucks and more especially to a hand truck employed for transportation of bulky packages or barrels for short distances.

It constitutes an improvement upon the organization shown in my pending application for Letters Patent filed March 20, 1916, Serial No. 85,403, which discloses a truck of the general character herein described.

The principal object of the invention is the provision of a truck of the character described which may be readily used as a skid, ladder and wagon stake.

Another object of the invention consists in the provision of adjustable side bars so that the length of the truck may be varied to suit the requirements when used as a skid.

Another object aims at the arrangement of means which prevents lateral displacement of the truck when used as a skid.

A still further object consists in the provision of means which permits the ready transformation of the truck into a skid or stake without requiring tedious or time wasting operations.

With these and other objects in view, the preferred embodiment consists in the novel arrangement and construction of parts to be hereinafter described and specifically pointed out in the appended claims.

In the accompanying drawing—Figure 1 is a perspective view of the truck when used as a skid. The dotted lines indicate the truck when used as a wagon stake. Fig. 2 is a transverse section view of the truck (slightly enlarged) showing the means for locking the adjustable side members in any desired position, the locking means being shown in a locked position onto the side bars. Fig. 3 is a view similar to Fig. 2, but showing the locking means disengaged from the side bars. Fig. 4 is a fragmentary perspective view of one side bar of the truck and the blade.

Referring to the drawing, 1 and 2 designate the side bars of a truck, the bars 1 being formed at one end with handles 3. The opposite ends of the bars 2 being provided with bearings 4 for a cross shaft 5, upon which the rollers 6 are mounted.

As will be seen by referring to Fig. 1, the lower side bars 2 are slidably fitted within the upper side bars 1 for the purpose of adjusting the length of the truck when used as a skid. When the truck has been extended to the desired length, it is locked by the means provided, which means consists of a lever 7 mounted upon a pin 8 carried by a plate 9 secured to one of the cross bars 10. Connecting rods 11 and 12 are connected by their ends to the lever 7 on opposite sides of the pin 8, the opposite ends of these rods being connected to jaws 13. These jaws 13 are mounted upon pins 14 (see Fig. 2) which pins are secured to the cross bars 10. The V-shaped portion 15 of each jaw is adapted to grip the inner longitudinal edges 16 of each of the side bars 1 and 2, so as to securely lock the upper and lower portions of the truck at any point of extension. When it is desired to release the locking means, the lever 7 is thrown over to the opposite side (see Fig. 3) this will cause the V-shaped jaws 13 to swing away from the edges 16 of each of the side bars 1 and 2, thereby releasing the same.

The side bars 1 and 2 are maintained in spaced relation by a plurality of cross bars 10 which simultaneously assume the function of a ladder when the truck is used as a skid, the cross bars serving as steps, so that small packages may be loaded or unloaded from the wagon with comparative ease, as access to the latter is easily obtained.

On the outer side of the side bars 1 adjacent to their upper ends a finger 17 is pivotally secured thereto by means of a pin 18, and, as is obvious from Fig. 1, such fingers 17 effect a wedge engagement between the handles 3 and the wagon-board 19 when the truck serves as a skid. A stop 20 limits the rotary movement of the fingers 17. The usual blade 21 is provided and may be oscillated about the shaft 5 in order to be brought into operative or inoperative position in accordance with the use to which the truck is subjected. The instrumentalities for permitting the rotation of the blade comprises an arm 22 loosely mounted on the shaft 5 and secured to the blade in any convenient or suitable manner, such as by rivets. The blade is locked in operative position by means of a stop 23 engaging the under side of the blade and a spring 24 abutting with an outwardly extending part 25 against the arm 22. An opening 26 is provided in the side bar 2 to permit the spring 24 to be forced into engagement with a side bar so as to clear the arm 22 when the blade is to be shifted into inoperative position.

The lower extremities of the side bars 2 are formed with tapering ends 27 and shoulders 28. When used as a wagon stake, the blade 21 is brought into the position shown in Fig. 1, whereupon the tapering ends 27 of the side bars 2 are inserted in the openings 29 provided for this purpose in the wagon-board, the openings 29 being of sufficient width to clear the stop 23 and spring 24. As is obvious from Fig. 1, the tapering ends 27 effect a wedge engagement with the openings 29.

It is obvious that minor changes and alterations may be made in the construction of the parts without departing from the spirit of the invention, and I would therefore indicate that I do not intend to limit myself to the modification shown by way of example in the drawing, but want to avail myself of any departure which fairly falls within the scope of my invention as pointed out in the appended claims.

I claim:

1. A truck, comprising a pair of longitudinally adjusting side bars, pivotally mounted jaws for locking the adjustment of said side bars, means for operating said jaws, a plurality of cross bars for maintaining said side bars in spaced relation, a shaft journaled in the lower ends of said side bars, a pair of rollers mounted upon said shaft, a blade pivotally secured to said shaft, means for locking said blade in operative and inoperative position, respectively, and means for holding said side bars in clamping engagement with a stationary object.

2. A truck, comprising a pair of longitudinally adjusting side bars, a pair of pivotally mounted V shaped jaws for locking said side bars in an adjusted position, a lever for operating said jaws, a plurality of cross bars maintaining said side bars in spaced relation, said side bars being formed with handles at their upper ends and terminating into tapering positions at their lower ends, a shaft provided adjacent the tapering ends of said side bars, a pair of rollers mounted upon said shaft, a blade secured to said shaft and adapted to be moved into operative and inoperative position, respectively, an abutment for holding said blade in operative position, resilient means for holding said blade in engagement with said abutment, fingers pivotally secured at the outer sides of said side bars adjacent to their upper ends, and abutments for limiting the rotary movement of said fingers, whereby the truck is held in clamping engagement with a stationary part if used as a skid, substantially as described.

In testimony whereof I hereunto affix my signature.

AUGUST N. ALLEN.

Copies of this patent may be obtained for five cents each, by addressing the "Commissioner of Patents, Washington, D. C."